(12) United States Patent
Shen et al.

(10) Patent No.: US 11,010,783 B2
(45) Date of Patent: May 18, 2021

(54) MATCHING PRODUCTS WITH SERVICE SCENARIOS

(71) Applicant: Advanced New Technologies Co., Ltd., George Town (KY)

(72) Inventors: Dong Shen, Hangzhou (CN); Hanping Xiao, Hangzhou (CN); Tangheng Liu, Hangzhou (CN); Jiajie Ye, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 170 days.

(21) Appl. No.: 15/800,823

(22) Filed: Nov. 1, 2017

(65) Prior Publication Data
US 2018/0053206 A1 Feb. 22, 2018

Related U.S. Application Data

(63) Continuation of application No. PCT/CN2016/079811, filed on Apr. 21, 2016.

(30) Foreign Application Priority Data

May 4, 2015 (CN) .......................... 201510221616.6

(51) Int. Cl.
*G06Q 30/02* (2012.01)
*G06Q 30/00* (2012.01)
(Continued)

(52) U.S. Cl.
CPC ......... *G06Q 30/0243* (2013.01); *G06F 16/00* (2019.01); *G06Q 10/0637* (2013.01);
(Continued)

(58) Field of Classification Search
CPC ..................................................... G06Q 30/02
See application file for complete search history.

(56) References Cited

U.S. PATENT DOCUMENTS 9,818,080 B2 * 11/2017 Cai .................... G06Q 30/0282
2009/0063249 A1    3/2009 Tomlin et al.
(Continued)

FOREIGN PATENT DOCUMENTS

CN         102708151        10/2012
CN         104077714        10/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Kurtis Gills
(74) *Attorney, Agent, or Firm* — Fish & Richardson P.C.

(57) ABSTRACT

For each service scenario out of a plurality of service scenarios, matching features of a to-be-matched product corresponding to the service scenario are acquired based on user features of users accessing the service scenario. A respective user feature mapping value of the service scenario is calculated based on the matching features of the to-be-matched product corresponding to the service scenario. Out of the plurality of service scenarios, a target service scenario of the to-be-matched product is selected based on the respective user feature mapping value of the service scenario.

18 Claims, 6 Drawing Sheets

(51) Int. Cl.
*G06F 16/00* (2019.01)
*G06Q 10/06* (2012.01)
*H04L 29/08* (2006.01)

(52) U.S. Cl.
CPC ......... *G06Q 30/00* (2013.01); *G06Q 30/0204* (2013.01); *H04L 67/025* (2013.01)

(56) References Cited

U.S. PATENT DOCUMENTS

2013/0013428 A1* 1/2013 Lyon .................... G06Q 30/06 705/14.73
2014/0304086 A1   10/2014 Dasdan et al.

FOREIGN PATENT DOCUMENTS

| CN | 104317822 | 1/2015 |
| CN | 102663026 | 9/2015 |
| JP | 2003006224 | 1/2003 |
| JP | 2006526853 | 11/2006 |
| JP | 2009104607 | 5/2009 |
| JP | JP 20100020365 | 2/2010 |
| JP | 4808207 | 11/2011 |
| JP | 2014115911 | 6/2014 |

OTHER PUBLICATIONS

Nakamoto, "Bitcoin: A Peer-to-Peer Electronic Cash System," www.bitcoin.org, 2005, 9 pages.

PCT International Preliminary Report on Patentability in International Application No. PCT/CN2016/079811, dated Nov. 7, 2017, 10 pages (with English translation).

PCT Written Opinion of the International Searching Authority in International Application No. PCT/CN2016/079811, dated Jul. 12, 2016, 9 pages (with English translation).

International Search Report issued by the International Searching Authority in International Application No. PCT/CN2016/079811 dated Jul. 12, 2016; 8 pages.

* cited by examiner

| Service Scenarios 110 | PV value in the last month 120 |
|---|---|
| Sina Blog 132 | 35000 |
| Sina News 134 | 26000 |
| Sina Finance 136 | 23000 |
| Sina Technology 138 | 21000 |
| Sina Sports 140 | 17050 |

MATCHING PRODUCTS WITH SERVICE SCENARIOS

This application is a continuation of PCT Application No. PCT/CN2016/079811, filed on Apr. 21, 2016, which claims priority to Chinese Patent Application No. 201510221616.6, filed on May 4, 2015, the entire contents of each which are hereby incorporated by reference.

BACKGROUND

With Internet technologies, a user can visit or otherwise access various web pages provided by a web site service provider or an application service provider through a web browser or an application (for example, an application on a mobile phone), or in other manners. A website or a service provider can classify and collect different web pages to form different service scenarios.

A service scenario can refer to a web page or a series of web pages that have a common subject or function, for example, for providing a particular service. A service scenario can include a series of web pages that are hierarchical in structure, and may also include one or more pop-up windows, conversational boxes, add-ons, or other components that may appear after a user's interaction with the service scenario (for example, by clicking a button or icon on the main web page of the service scenario).

As an example, a portal website can provide the following sub-sites:
SINA TECHNOLOGY
SINA SPORTS
SINA NEWS
SINA FINANCE
. . .

Each sub-site can be regarded as a service scenario. Each service scenario can be further divided into service scenarios with increasingly-focused subjects or functions for providing finer or more specific services. For example, the SINA SPORTS sub-site ( ) can include multiple service scenarios, such as NBA, CBA, Chinese football, and international football. Similarly, the SINA TECHNOLOGY sub-site can include multiple service scenarios, such as mobile phones, cameras, and household appliances.

SUMMARY

The present disclosure describes matching a product with a target service scenario.

In an implementation, for each service scenario out of a plurality of service scenarios, matching features of a to-be-matched product corresponding to the service scenario are acquired based on user features of users accessing the service scenario. A respective user feature mapping value of the service scenario is calculated based on the matching features of the to-be-matched product corresponding to the service scenario. Out of the plurality of service scenarios, a target service scenario of the to-be-matched product is selected based on the respective user feature mapping value of the service scenario.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the subject matter described can determine a target service scenario for a product based on multiple user features. Second, the subject matter described can provide a more appropriate target service scenario for a product. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes matching a product with a target service scenario, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

A service scenario can include or correspond to one or more of different access interfaces for different services. For example, access interfaces for different types of services can be configured in mobile applications (for example, an application installed on a mobile terminal). As an example, a home page of the ALIPAY Wallet can be configured to include access interfaces for different types of services, such as, airplane tickets, films, taxis, and express delivery. In some implementations, similar to sub-sites, each of the access interfaces can be associated with additional access interfaces applicable to sub-services.

A website service provider or application service provider can configure a service scenario, for example, by configuring one or more access interfaces associated with the service scenario. As an example, a service access interface for a new delivery service provider, Xingxing Express, can be configured on a page that is redirected from a web page that contains shipping options of merchandise in an application executing on a mobile terminal (for example, a smartphone or tablet-type computer). As another example, a website service provider may configure, in an automobile service scenario (for example, a website presenting information of automobiles of various bands), a service access interface of a new automobile brand. For example, the service access interface of the new automobile brand can include a pop-up window showing related services (for example, a purchase consulting or a test drive appointment) of the new automobile brand in response to a click of a button in the automobile service scenario. In some implementations, advertisements can be included in the service access interfaces. The content of a service access interface (for example, the promotions, advertisements, or other information of the Xingxing Express and the new automobile brand) can be referred to as a product.

In some implementations, a website service provider or application service provider can determine a service scenario to which a product can be placed, displayed, included or otherwise matched. In some implementations, a product can be matched to a target service scenario based on one or more criteria. The target service scenario can be, for example, a service scenario that is most likely to attract users to view or otherwise use the product, and further to buy or consume an underlying good or service (for example, the purchase of the automobile or the delivery service) associated with the product.

The described techniques can help determine a more appropriate service scenario for a product. Rather than merely using a single metric (for example, page views of service scenarios), the described techniques can match a product with a target service scenario based on multiple user attributes or features (for example, registration information and browsing history of the users) with respect to different service scenarios. The described techniques can help improve sales, market penetration, or user basis of the underlying service provider of the product. The described techniques can help improve a website service provider or application service provider to better allocate, design, or otherwise configure its resources and contents to serve its customers (for example, the Xingxing Express and the new automobile brand who rely on the service scenario for advertisements and providing service access interfaces).

Figure 1:
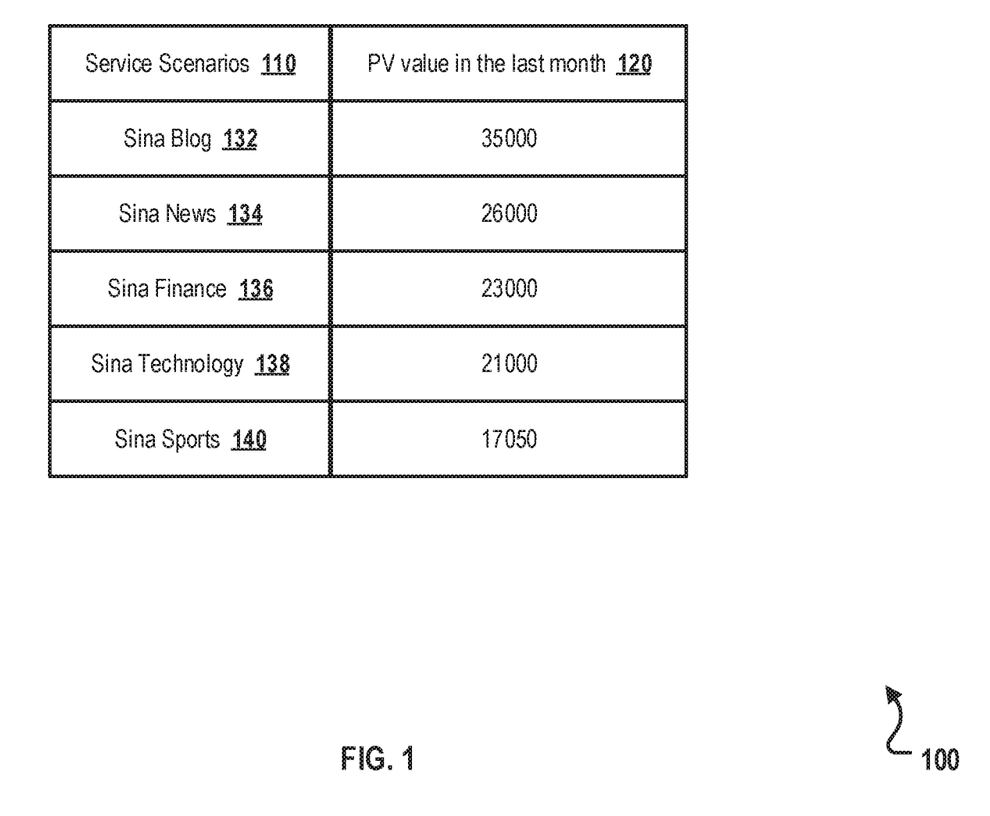
FIG. 1 is a table illustrating examples of multiple service scenarios with their page views, according to an implementation of the present disclosure.

FIG. 1 is a table 100 illustrating examples of multiple service scenarios 110 with their page views 120, according to an implementation of the present disclosure. The example service scenarios 110 include multiple sub-sites of SINA, SINA BLOG 132, SINA NEWS 134, SINA FINANCE 136, SINA TECHNOLOGY 138, and SINA SPORTS 140. Each of the example service scenarios 110 has a respective page view value that includes the number of page views or hits by users in the last month. In some implementations, the number of page views or hits of a web page increases by one every time a user refreshes the web page. For a service scenario that includes multiple web pages, page views of the multiple pages in the service scenario can be counted as the page view of the service scenario.

As shown in FIG. 1, SINA BLOG has the maximum page view. Conventional techniques may match the automobile product to the service scenario of SINA BLOG based on the page view. Accordingly, a service access interface is set in the service scenario of SINA BLOG for the automobile product. As another example, a service access interface of Xingxing Express can be likewise matched to a taxi service scenario in an application based on page views of different service scenarios. In some implementations, however, matching a product with a service scenario only based on a page view or the like may not give rise to the more appropriate service scenario. The techniques described in this disclosure can help determine a more appropriate service scenario for a product, and allow configuration of a service access interface associated with the product in the more appropriate service scenario. For example, the described techniques can match the automobile product with the service scenario of SINA AUTOMOBILE, rather than SINA BLOG. Similarly, the described techniques can match the Xingxing Express product with the service scenario of delivery service, rather than the taxi service scenario.

Figure 2:
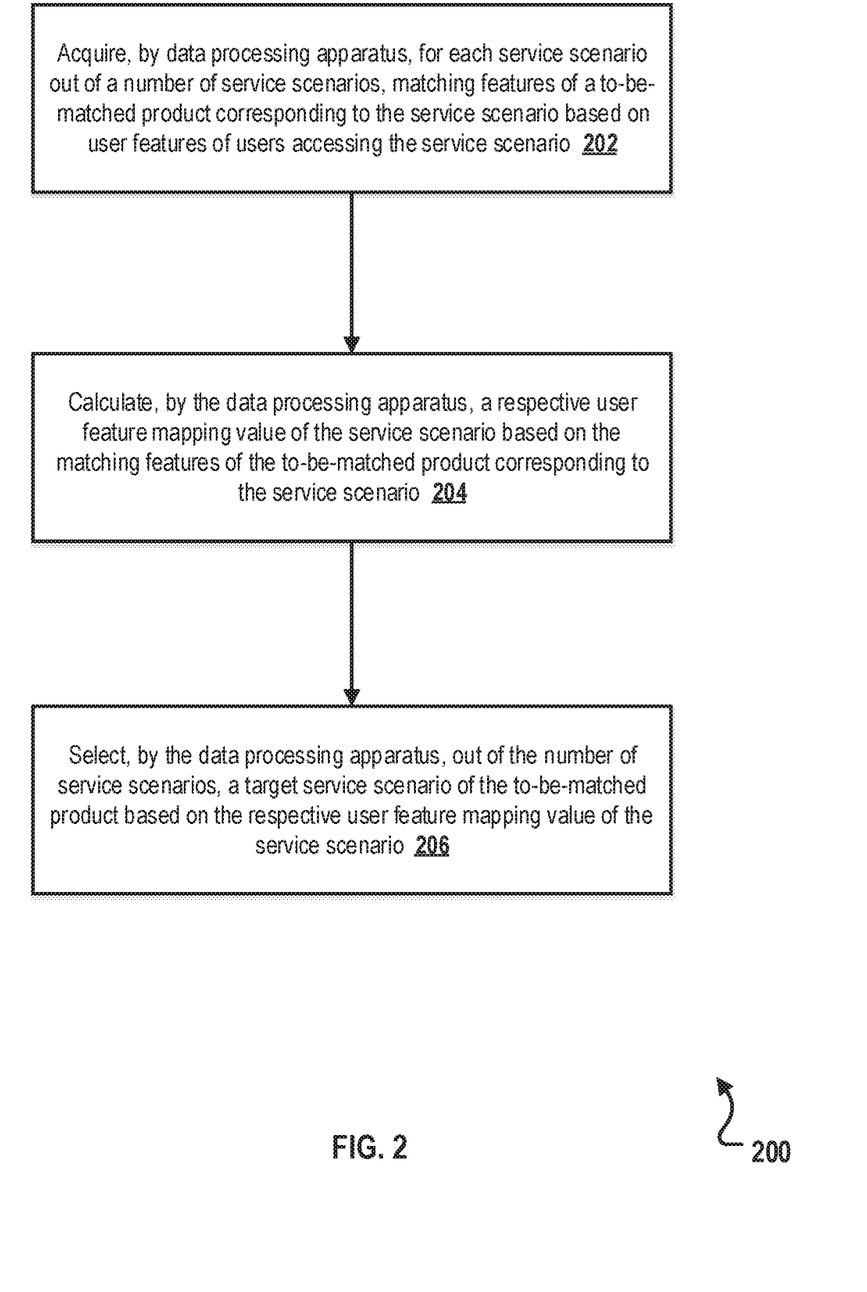
FIG. 2 is a flowchart illustrating an example of a computer-implemented method for matching a product with a target service scenario, according to an implementation of the present disclosure.

FIG. 2 is a flowchart illustrating an example of a computer-implemented method 200 for matching a product with a target service scenario, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, for each service scenario out of a number of service scenarios, one or more matching features of a to-be-matched product corresponding to the service scenario are acquired based on user features of users accessing the service scenario. In some implementations, the service scenario comprises one or more web page accessible by the users, for example, through a web browser or an application (for example, an application on a mobile phone), or in another manner. The to-be-matched product comprises content (for example, promotions, advertisements, product or service descriptions, contact, or other information) to be presented in a target service scenario of the to-be-matched product.

In some implementations, the one or more matching features are acquired by data processing apparatus (for example, a server of a website service provider or application service provider). In some implementations, acquiring matching features of a to-be-matched product can include retrieving or receiving the one or more matching features locally from a memory or a data store, or remotely from another device over a communication network. In some implementations, acquiring matching features of a to-be-matched product can include identifying selecting, or deriving attributes or features that can be used to determine the target service scenario of the to-be-matched product based on the user features of users accessing the service scenario.

In some implementations, a user visits or otherwise accesses, through a terminal (for example, a web browser) or an application (for example, a mobile app on a mobile device), different service scenarios that are provided by a website service provider or an application service provider. In some implementations, the server of the website service provider or the application service provider can receive, record, log, or otherwise acquire registration information, access records, or other information of the user that accesses the service scenarios. In some implementations, the registration information, access records, or other information of the user can be retrieved, received, bought, or otherwise acquired from a database, a survey agency, or some other sources.

In some implementations, the user features of users accessing the service scenario can include features derived from registration information or an access record of the users accessing the service scenario. For example, the user features can include features derived from registration information, such as, the user's identifier (ID), gender, age, and address of the user. In some implementations, the access record can includes subscription information, and browse history of the user. For example, the user features can include features derived from the subscription information (for example, subscription information specified or other identified by the user). Such user features can include, for example, one or more of the user's registered hobbies or interests, subscribed sub-site or sections, favorite or bookmarked web pages, or other information indicates the user's interests, preferences, or habits. In some implementations, the user features can also include features derived from recorded historical behaviors of the user with respect to the website or the application. Such user features can include, for example, total amounts of the user's transactions (for example, purchase, sale, trade, or other financial activities) in different categories (for example, maternal and infant goods, household appliance, and outdoor products) on a shopping website or an application.

In some implementations, the data processing apparatus can receive, aggregate, derive, or otherwise acquire different user features of users accessing different service scenarios provided by one or more of a website service provider or an application service provider. The user features can be used for evaluating user feature mapping values of different service scenarios.

As an example, user features can be in the form of $\{X1, X2, X3, \ldots, X_n\}$, wherein X1, X2, X3, . . . , $X_n$ represent some or all of the following information of the user: {ID, gender, age, subscribed or followed service scenarios, hobbies or interests, subscribed sub-sites or sections, favorite or bookmarked web pages, purchase history, total transaction amount in maternal and infant goods, total transaction amount in household appliance, total transaction amount in outdoors class products, . . . }. The user features can represent additional or different information of users accessing the service scenario. Different users may have the same or different user features.

Different service scenarios may attract respective groups of users to visit. For example, a service scenario 1 may include users M1, M2, M3, . . . , M100; a service scenario 2 may include users N1, N2, N3, . . . , N50; a service scenario 3 may include users P1, P2, P3, . . . , P500; and a service scenario 4 may include users Q1, Q2, Q3, . . . , Q300. In some implementations, the group users accessing different service scenarios can be distinct, partially overlapped, or fully overlapped. The respective groups of users accessing the different service scenarios may share identical, similar, or different user features. In some implementations, the common or similar user features of a certain group of users accessing a certain service scenario may correlate with a user's likelihood of accessing the certain service scenario. Accordingly, some of the user features can be used as matching features for matching a to-be-matched product with a target service scenario.

Matching features of the to-be-matched product corresponding to the service scenario can be selected, derived, or otherwise acquired based on the user features of users accessing the service scenario. In some implementations, acquiring matching features of a to-be-matched product corresponding to the service scenario based on user features of users accessing the service scenario comprises acquiring a predetermined selection of features that are acquired based on the user features of users accessing the service scenario. In some implementations, the predetermined selection of matching features that can include a predetermined selection of user features themselves, or a predetermined selection of features that are derived from the user features (for example, with quantifying, normalization, or other operations).

For example, in matching a maternal and child product, such as maternal and child class advertising or application interface, the matching features can include a predetermined selection of user features such as the gender, age, a service scenario of interest, hobbies, favorite or bookmarked page, purchase history, and maternal and child class total transaction amount. As another example, for an automotive products, such as a consulting interface for automobile purchases, the matching features can include another predetermined selection of user features such as user's hobbies, interests, subscriptions, favorite or bookmark pages, and purchase records. Different products can have the same or different matching features.

In some implementations, at 202, in addition to or as an alternative to using a predetermined selection of features, the matching features can be acquired automatically, for example, based on the user features of users accessing the service scenario according to one or more data processing techniques for processing big data. For example, one or more machine learning algorithms, including but not limited to, example logistic regression, Gradient Boosting Decision Tree (GBDT), decision trees, and even depth learning machine learning methods can be used to acquire the matching features.

In some implementations, with the big data processing method, relationships (for example, in terms of functions and weights) between the matching features and the user features can be acquired. In some implementations, a unified equation or formula can be acquired. In this disclosure, logistic regression is used as an example of describing how to acquire the matching features based on modeling by matching features, and how to acquire a user feature mapping value of the service scenario based on the matching features, where the value falls within the range between 0 and 1. Additional or different big data processing algorithms can be used.

In some implementations, the matching features can be acquired by selecting key features using logistic regression (also known as principal component analysis in machine learning). The key features include features to be used in determining a user feature mapping value of the service scenario. In some implementations, acquiring the matching features according to a machine learning algorithm can include one or more of the following steps.

A1: annotate all user features of a user accessing a service scenario based on whether the user uses the target product. For example, for a user data that includes 500 users, each user having 1000 user features, an annotation or label can be added to each user, to indicate whether the user uses the target product. The annotation or label can be a binary value (for example, 1 means that the user uses the target product, while 0 means that the user does not use the target product) or in another format.

A2: calculate, for each user feature (out of the 1000 user features), an information value between the each user feature and the annotation, for example, according to principal component analysis. As a result, a degree of influence of each of the user feature on whether the user uses the target product can be calculated. The information value can be determined based on the degree of influence.

A3: assort the user features according to the information value. A predetermined number of user features can be kept as the key feature. In the example, the 1000 user features can be sorted according to the respective information values, and the 200 user features with the largest 200 information values can be kept as the key feature.

A4: perform a logistic regression using the preset number of user features and whether the user uses the target product. Based on the statistical significance requirement (p_value) of the logistic regression algorithm, exclude non-significant indicators and retain significant indicators.

In this way, the matching features of the target product can be acquired by determining a smaller number of user features that are most relevant in determining whether the user uses the target product. From 202, method 200 proceeds to 204.

At 204, a respective user feature mapping value of the service scenario is calculated based on the matching features of the to-be-matched product corresponding to the service scenario. In some implementations, calculating a respective user feature mapping value of the service scenario based on the matching features of the to-be-matched product corresponding to the service scenario comprises quantifying a first user feature corresponding to a first matching feature of the to-be-matched product corresponding to the service scenario according to a quantification rule; and calculating the respective user feature mapping value of the service scenario based on the first user feature corresponding to the first matching feature respective user feature according to a mapping rule. The quantification rule can, for example, define a range (for example, from 0 to 1) of resulting quantified first user feature corresponding to a first matching feature. In some implementations, the quantification rule can be the same for calculating respective user feature mapping values of different service scenarios. The mapping rule can include one or more functions of the matching features of the to-be-matched product. The one or more functions can include, for example, summation, averaging, or other operations. The mapping rule can be the same for calculating respective user feature mapping values of different service scenarios. In other words, the same mapping rule and the same quantification rule can be applied for calculating respective user feature mapping values across all candidate service scenarios, so as to ensure the uniformity among all candidate service scenarios and to more accurately reflect the correlation between the to-be-matched product and a certain service scenario.

As example, assume that matching features of a to-be-matched product include {X2, X3, X5, X8}. For each of the different service scenarios, a respective user feature mapping value can be calculated based on the user features corresponding to the matching features of the to-be-matched product. For example, for each user in the service scenario 1, the user features corresponding to the matching features {X2, X3, X5, X8} can be quantified according to a quantification rule, and the quantified user features corresponding to the service scenario 1 can be summed and averaged to serve as a user feature mapping value for the service scenario 1 (denoted as $MV_{service\ scenario\ 1}$). For each user in the service scenario 2, the user features corresponding to the matching features {X2, X3, X5, X8} can be quantified according to the same quantification rule, and the quantified user features corresponding to the service scenario 2 can be summed and averaged to serve as a user feature mapping value for the service scenario 2 (denoted as $MV_{service\ scenario\ 2}$). As an example, the resulting user feature mapping values for the two service scenarios are: $MV_{service\ scenario\ 1}=1.5$; $MV_{service\ scenario\ 2}=2.7$.

Similarly, for each user in the service scenario 3, the user features corresponding to the matching features {X2, X3, X5, X8} can be quantified according to a quantification rule, and the quantified user features corresponding to the service scenario 3 can be summed and averaged to serve as a user feature mapping value for the service scenario 1 (denoted as $MV_{service\ scenario\ 3}$). For each user in the service scenario 4, the user features corresponding to the matching features {X2, X3, X5, X8} can be quantified according to the same quantification rule, and the quantified user features corresponding to the service scenario 4 can be summed and averaged to serve as a user feature mapping value for the service scenario 4 (denoted as $MV_{service\ scenario\ 4}$). As an example, the resulting user feature mapping values for the two service scenarios are: $MV_{service\ scenario\ 3}=15000$, $MV_{service\ scenario\ 4}=7280$.

In some implementations, calculating a respective user feature mapping value of the service scenario based on the matching features of the to-be-matched product corresponding to the service scenario comprises obtaining a mapping function between the respective user feature mapping value of the service scenario and the matching features of the to-be-matched product corresponding to the service scenario using a machine learning method; and calculating the respective user feature mapping value of the service scenario based on the mapping function.

For example, by using the machine learning algorithm at 202 for acquiring matching features of the to-be-matched product, at A4, a mapping relationship between the matching feature and the user feature mapping value can be acquired by performing the logistic regression, excluding non-significant indicators, and keeping significant indicators and its corresponding coefficients, based on the statistical significance requirement (p_value). The mapping relationship can be a mapping relationship between every matching features to the user feature mapping value with a final range of [0,1]. As such, at 204, the respective user feature mapping value of the service scenario can be calculated based on using the mapping relationship for each service scenario based on the matching features of the to-be-matched products to be matched user feature mapping value. In some implementations, because of the mapping derived by the logistic regression algorithm are based on the collection, trial and trend simulation of big data, it may better reflect the relationship between the user features and the matching features, and the relationship between the matching features and the user feature map values. From 204, method 200 proceeds to 206.

At 206, a target service scenario of the to-be-matched product is selected, out of the number of service scenarios, based on the respective user feature mapping value of the service scenario. In some implementations, the more matching features of the to-be-matched product that a service scenario have, the better match that the service scenario would be for the to-be-matched product. Thus, high user feature mapping value may be selected to be the target service scenario matching the to-be-matched product. In the previous example, the service scenario 3 has more users and thus more user features corresponding to the matching features of the to-be-matched product. As such, the user feature mapping values for the service scenario 3 is larger than that of the service scenario 4, making the service scenario 3 a better match for the to-be-matched product than the service scenario 4. In some implementations, a service scenario having a highest user feature mapping value among a number of respective user feature mapping values of the number of service scenarios can be selected as the target service scenario of the to-be-matched product. In some implementations, more than one service scenario can be selected as the target service scenario of the to-be-matched product.

In some implementations, a certain matching feature of the to-be-matched product that is repeated more often than other features in a certain service scenario, may make the certain service scenario a better match to to-be-matched product. For example, assume the to-be-matched product is maternal and child product. In some implementations, users who purchase the maternal and child product are mainly concentrated in the service scenario 2. Accordingly, some matching features (for example, total amount of transactions) corresponding to the user accessing the service scenario 2 may have a higher impact on the user feature mapping value of the service scenario. As such, even if there are significantly less users accessing service scenario 1 than accessing service scenario 1, according to the calculation described at 204, the user feature mapping values for the service scenario 2 is still higher than that of the service scenario 1, suggesting the service scenario 2 is a better service scenario to place the product than the service scenario 1.

In some implementations, depending on the nature of the to-be-matched product, a service scenario that includes less matching features of the to-be-matched product may be a better fit for the to-be-matched product. Thus, a service scenario with a low user feature mapping value may be selected to be the service scenario matching products business service scenarios. In some implementations, a service scenario having a lowest user feature mapping value among a number of respective user feature mapping values of the number of service scenarios is selected as the target service scenario of the to-be-matched product. Additional or different selection choices based on the user feature mapping value can be made. After 206, method 200 stops.

Figure 3:
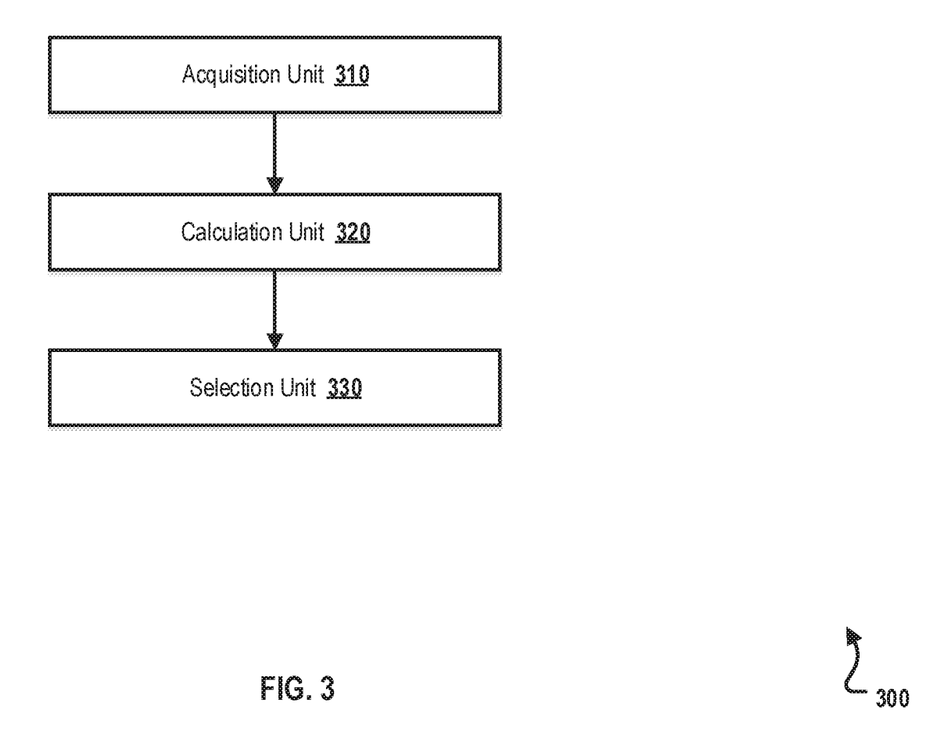
FIG. 3 is a block diagram of an example of a computer-implemented system configured to matching a product with a target service scenario, according to an implementation of the present disclosure.

FIG. 3 is a block diagram of an example of a computer-implemented system 300 configured to matching a product with a target service scenario, according to an implementation of the present disclosure.

As shown in FIG. 3, the system includes an acquisition unit 310 configured to for each service scenario out of a number of service scenarios, matching features of a to-be-matched product corresponding to the service scenario based on user features of users accessing the service scenario; a calculation unit 320 configured to calculate a respective user feature mapping value of the service scenario based on the matching features of the to-be-matched product corresponding to the service scenario; and a selection unit 330 configured to select, out of the number of service scenarios, a target service scenario of the to-be-matched product based on the respective user feature mapping value of the service scenario.

In some implementations, the acquisition unit 310 may include a first acquisition unit configured to acquire the user features of users accessing the service scenario that comprises features derived from registration information or an access record of the users accessing the service scenario. In some implementations, the acquisition unit 310 may include a second acquisition unit configured to acquire a predetermined selection of features based on the user features of users accessing the service scenario as the matching features of the to-be-matched product.

Figure 4:
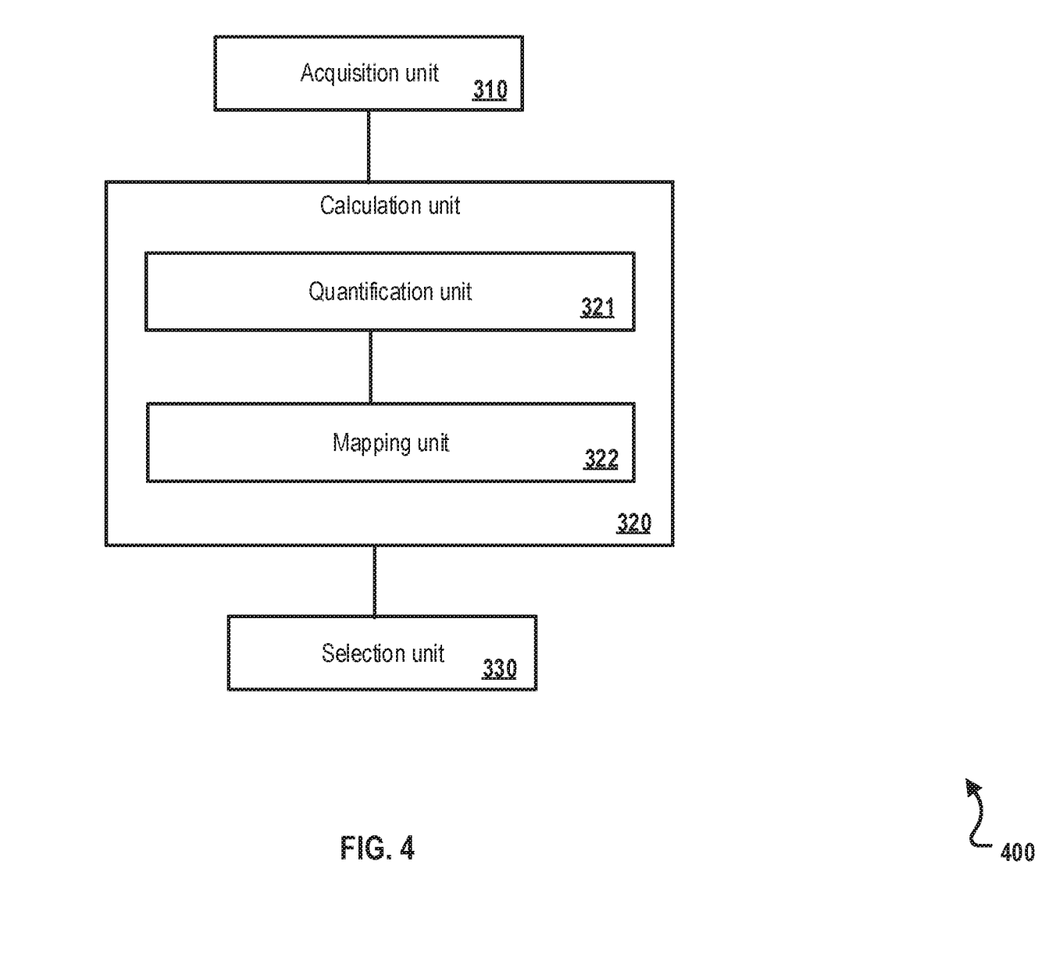
FIG. 4 is a block diagram of another example of a computer-implemented system configured to matching a product with a target service scenario, according to an implementation of the present disclosure.

FIG. 4 is a block diagram of an example of another computer-implemented system 400 configured to matching a product with a target service scenario, according to an implementation of the present disclosure. In some implementations, as shown in FIG. 4, the calculation unit 320 may include a quantification unit 321 and a mapping unit 322, wherein the quantification unit 321 is configured to quantify a first user feature corresponding to a first matching feature of the to-be-matched product corresponding to the service scenario according to a quantification rule, wherein the quantification rule is the same for the number of service scenarios; and the mapping unit 322 is configured to calculate the respective user feature mapping value of the service scenario based on the first user feature corresponding to the first matching feature respective user feature according to a mapping rule, wherein the mapping rule is the same for the number of service scenarios.

In some implementations, the selection unit may select a service scenario having a highest user feature mapping value among a number of respective user feature mapping values of the number of service scenarios as the target service scenario of the to-be-matched product; or a service scenario having a lowest user feature mapping value among a number of respective user feature mapping values of the number of service scenarios as the target service scenario of the to-be-matched product.

In some implementations, the acquiring matching features of the to-be-matched product by the acquisition unit can be acquiring matching features of a to-be-matched product corresponding to the service scenario based on the user features of users accessing the service scenario according to a machine learning algorithm.

Figure 5:
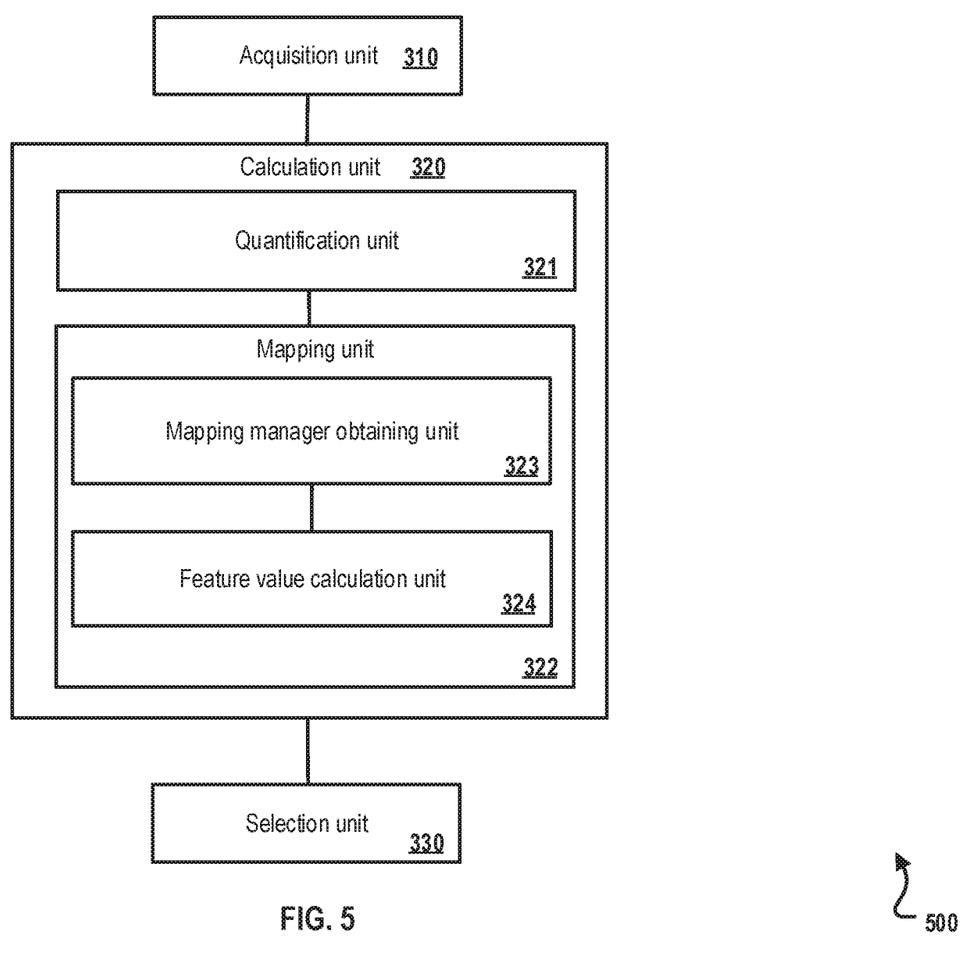
FIG. 5 is a block diagram of another example of a computer-implemented system configured to matching a product with a target service scenario, according to an implementation of the present disclosure.

FIG. 5 is a block diagram of an example of another computer-implemented system 500 configured to matching a product with a target service scenario, according to an implementation of the present disclosure. In some implementations, as shown in FIG. 5, the mapping unit 322 may include a mapping manner obtaining unit 323 and a feature value calculation unit 324, wherein the mapping manner obtaining unit 323 is configured to obtain a mapping function between the respective user feature mapping value of the service scenario and the matching features of the to-be-matched product corresponding to the service scenario using a machine learning method; and the feature value calculation unit 324 is configured to calculate the respective user feature mapping value of the service scenario based on the mapping function.

In some implementations, the machine learning method may include at least one of a logistic regression algorithm, a GBDT algorithm, a decision tree algorithm, and a deep learning algorithm.

Figure 6:
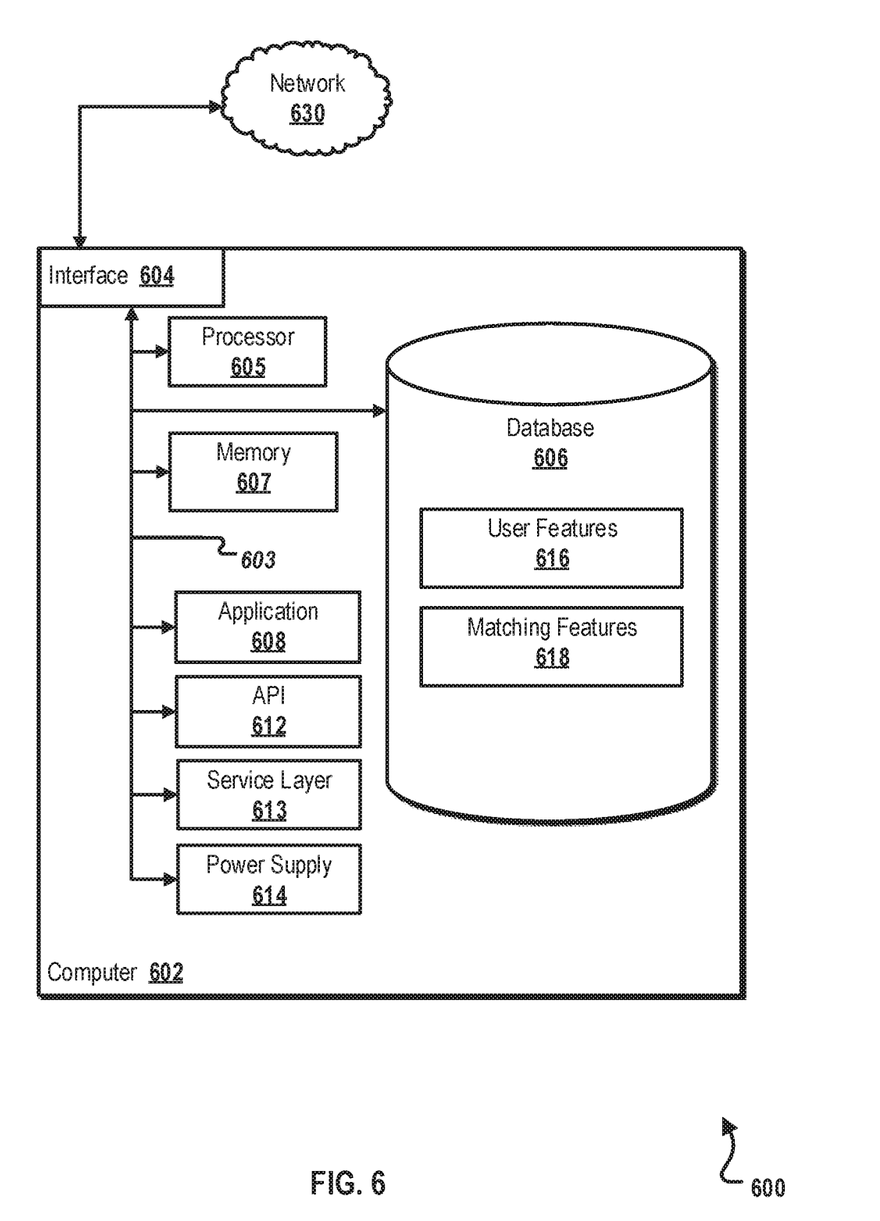
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented system 600 used to provide computational functionalities associated with described algorithms, methods, functions, processes, flows, and procedures, according to an implementation of the present disclosure. In the illustrated implementation, system 600 includes a computer 602 and a network 630.

The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can include an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a distributed computing system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

At a high level, the computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users (for example, from a command console or by another internal access method), external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and includes logic encoded in software, hardware, or a combination of software and hardware. More specifically, the interface 604 can include software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds the previously described user features 616 of users accessing one or more service scenarios and matching features 618 of a to-be-matched product.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Described implementations of the subject matter can include one or more features, alone or in combination.

For example, in a first implementation, a computer-implemented method, comprising: acquiring, by data processing apparatus, for each service scenario out of a plurality of service scenarios, matching features of a to-be-matched product corresponding to the service scenario based on user features of users accessing the service scenario; calculating, by the data processing apparatus, a respective user feature mapping value of the service scenario based on the matching features of the to-be-matched product corresponding to the service scenario; and selecting, by the data processing apparatus, out of the plurality of service scenarios, a target service scenario of the to-be-matched product based on the respective user feature mapping value of the service scenario.

In a second implement, a non-transitory, computer-readable medium storing one or more instructions executable by a computer system to perform operations comprising: acquiring, for each service scenario out of a plurality of service scenarios, matching features of a to-be-matched product corresponding to the service scenario based on user features of users accessing the service scenario; calculating a respective user feature mapping value of the service scenario based on the matching features of the to-be-matched product corresponding to the service scenario; and selecting, out of the plurality of service scenarios, a target service scenario of the to-be-matched product based on the respective user feature mapping value of the service scenario.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: acquiring, by data processing apparatus, for each service scenario out of a plurality of service scenarios, matching features of a to-be-matched product corresponding to the service scenario based on user features of users accessing the service scenario; calculating, by the data processing apparatus, a respective user feature mapping value of the service scenario based on the matching features of the to-be-matched product corresponding to the service scenario; and selecting, by the data processing apparatus, out of the plurality of service scenarios, a target service scenario of the to-be-matched product based on the respective user feature mapping value of the service scenario.

The foregoing and other described implementations can each, optionally, include one or more of the following features:

A first feature, combinable with any of the following features, wherein the user features of users accessing the service scenario comprises features derived from registration information or an access record of the users accessing the service scenario.

A second feature, combinable with any of the previous or following features, wherein acquiring matching features of a to-be-matched product corresponding to the service scenario based on user features of users accessing the service scenario comprises acquiring a predetermined selection of features based on the user features of users accessing the service scenario as the matching features of the to-be-matched product.

A third feature, combinable with any of the previous or following features, wherein calculating a respective user feature mapping value of the service scenario based on the matching features of the to-be-matched product corresponding to the service scenario comprises: quantifying a first user feature corresponding to a first matching feature of the to-be-matched product corresponding to the service scenario according to a quantification rule, wherein the quantification rule is the same for the plurality of service scenarios; and calculating the respective user feature mapping value of the service scenario based on the first user feature corresponding to the first matching feature respective user feature according to a mapping rule, wherein the mapping rule is the same for the plurality of service scenarios.

A fourth feature, combinable with any of the previous or following features, wherein selecting, out of the plurality of service scenarios, a target service scenario of the to-be-matched product based on the respective user feature mapping value of the service scenario comprises: selecting a service scenario having a lowest user feature mapping value among a plurality of respective user feature mapping values of the plurality of service scenarios as the target service scenario of the to-be-matched product; or selecting a service scenario having a highest user feature mapping value among a plurality of respective user feature mapping values of the plurality of service scenarios as the target service scenario of the to-be-matched product.

A fifth feature, combinable with any of the previous or following features, wherein acquiring matching features of a to-be-matched product corresponding to the service scenario based on user features of users accessing the service scenario comprises acquiring matching features of a to-be-matched product corresponding to the service scenario based on the user features of users accessing the service scenario according to a machine learning algorithm.

A sixth feature, combinable with any of the previous or following features, wherein the machine learning algorithm comprises at least one or more of a logistic regression algorithm, a Gradient Boosting Decision Tree (GBDT) algorithm, a decision tree algorithm, or a deep learning algorithm.

A seventh feature, combinable with any of the previous or following features, wherein calculating a respective user feature mapping value of the service scenario based on the matching features of the to-be-matched product corresponding to the service scenario comprises: obtaining a mapping function between the respective user feature mapping value of the service scenario and the matching features of the to-be-matched product corresponding to the service scenario using a machine learning method; and calculating the respective user feature mapping value of the service scenario based on the mapping function.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    acquiring, by data processing apparatus of a distributed computing system of a website having a plurality of service scenarios, and for each service scenario of the plurality of service scenarios of the website, respective representative features of a plurality of users who have accessed the website through each service scenario, wherein each service scenario is a different respective access interface for accessing a different respective service of the website;
    obtaining, by the data processing apparatus of the distributed computing system, features of a to-be-matched product to be presented to users accessing the website through one of the service scenarios;
    calculating, by the data processing apparatus of the distributed computing system, a respective user feature mapping value of each service scenario of the plurality of the service scenarios of the website, wherein the respective user feature mapping value of each service scenario is based on matching features of the to-be-matched product corresponding to the service scenario to respective representative features of the plurality of the users who have accessed the website through the service scenario, comprising:
        quantifying a first user feature corresponding to a first matching feature of the to-be-matched product corresponding to each service scenario according to a quantification rule, wherein the quantification rule is the same for the plurality of the service scenarios; and
        calculating the respective user feature mapping value of each service scenario based on the first user feature corresponding to the first matching feature according to a mapping rule, wherein the mapping rule is the same for the plurality of the service scenarios;
    selecting, by the data processing apparatus of the distributed computing system, among the plurality of service scenarios of the website, a target service scenario for the to-be-matched product based on the respective user feature mapping value of the target service scenario;
    receiving, by the data processing apparatus of the distributed computing system of the website, a request for service information for the target service scenario of the website; and
    providing, by the data processing apparatus of the distributed computing system for display to a user, service scenario information and the to-be-matched product selected for the target service scenario of the website.

2. The method of claim 1, wherein the respective representative features of the plurality of the users who have accessed the web site through each service scenario comprises features derived from registration information or an access record of the plurality of the users who have accessed the web site through each service scenario.

3. The method of claim 1, wherein selecting, among the plurality of the service scenarios of the website, the target service scenario for the to-be-matched product based on the respective user feature mapping value of the target service scenario comprises:
    selecting a service scenario having a lowest user feature mapping value among a plurality of respective user feature mapping values of the plurality of the service scenarios as the target service scenario for the to-be-matched product; or
    selecting a service scenario having a highest user feature mapping value among a plurality of respective user feature mapping values of the plurality of the service scenarios as the target service scenario for the to-be-matched product.

4. The method of claim 1, wherein obtaining features of the to-be-matched product to be presented to the users accessing the website through one of the service scenarios comprises acquiring matching features of the to-be-matched product corresponding to one of the service scenarios based on the respective representative features of the plurality of the users who have accessed the web site through the service scenarios according to a machine learning algorithm.

5. The method of claim 4, wherein the machine learning algorithm comprises at least one or more of a logistic regression algorithm, a Gradient Boosting Decision Tree (GBDT) algorithm, a decision tree algorithm, or a deep learning algorithm.

6. The method of claim 1, wherein calculating the respective user feature mapping value of each service scenario based on the matching features of the to-be-matched product corresponding to each service scenario comprises:
    obtaining a mapping function between the respective user feature mapping value of each service scenario and the matching features of the to-be-matched product corresponding to each service scenario using a machine learning method; and
    calculating the respective user feature mapping value of each service scenario based on the mapping function.

7. A non-transitory, computer-readable medium storing one or more instructions executable by a computer system to perform operations comprising:
    acquiring, by data processing apparatus of a distributed computing system of a website having a plurality of service scenarios, and for each service scenario of the plurality of service scenarios of the website, respective representative features of a plurality of users who have accessed the website through each service scenario, wherein each service scenario is a different respective access interface for accessing a different respective service of the website;

obtaining, by the data processing apparatus of the distributed computing system, features of a to-be-matched product to be presented to users accessing the website through one of the service scenarios;

calculating, by the data processing apparatus of the distributed computing system, a respective user feature mapping value of each service scenario of the plurality of the service scenarios of the website, wherein the respective user feature mapping value of each service scenario is based on matching features of the to-be-matched product corresponding to the service scenario to respective representative features of the plurality of the users who have accessed the website through the service scenario, comprising:

quantifying a first user feature corresponding to a first matching feature of the to-be-matched product corresponding to each service scenario according to a quantification rule, wherein the quantification rule is the same for the plurality of the service scenarios; and calculating the respective user feature mapping value of each service scenario based on the first user feature corresponding to the first matching feature according to a mapping rule, wherein the mapping rule is the same for the plurality of the service scenarios;

selecting, by the data processing apparatus of the distributed computing system, among the plurality of service scenarios of the website, a target service scenario for the to-be-matched product based on the respective user feature mapping value of the target service scenario;

receiving, by the data processing apparatus of the distributed computing system of the website, a request for service information for the target service scenario of the website; and providing, by the data processing apparatus of the distributed computing system for display to a user, service scenario information and the to-be-matched product selected for the target service scenario of the website.

8. The computer-readable medium of claim 7, wherein the respective representative features of the plurality of the users who have accessed the website through each service scenario comprises features derived from registration information or an access record of the plurality of the users who have accessed the website through each service scenario.

9. The computer-readable medium of claim 7, wherein selecting, among the plurality of the service scenarios of the website, the target service scenario for the to-be-matched product based on the respective user feature mapping value of the target service scenario comprises:

selecting a service scenario having a lowest user feature mapping value among a plurality of respective user feature mapping values of the plurality of the service scenarios as the target service scenario for the to-be-matched product; or selecting a service scenario having a highest user feature mapping value among a plurality of respective user feature mapping values of the plurality of the service scenarios as the target service scenario for the to-be-matched product.

10. The computer-readable medium of claim 7, wherein obtaining features of the to-be-matched product to be presented to the users accessing the website through one of the service scenarios comprises acquiring matching features of the to-be-matched product corresponding to one of the service scenarios based on the respective representative features of the plurality of the users who have accessed the website through the service scenarios according to a machine learning algorithm.

11. The computer-readable medium of claim 7, wherein calculating the respective user feature mapping value of each service scenario based on the matching features of the to-be-matched product corresponding to each service scenario comprises:

obtaining a mapping function between the respective user feature mapping value of each service scenario and the matching features of the to-be-matched product corresponding to each service scenario using a machine learning method; and calculating the respective user feature mapping value of each service scenario based on the mapping function.

12. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

acquiring, by data processing apparatus of a distributed computing system of a website having a plurality of service scenarios, and for each service scenario of the plurality of service scenarios of the website, respective representative features of a plurality of users who have accessed the website through each service scenario, wherein each service scenario is a different respective access interface for accessing a different respective service of the website;

obtaining, by the data processing apparatus of the distributed computing system, features of a to-be-matched product to be presented to users accessing the website through one of the service scenarios;

calculating, by the data processing apparatus of the distributed computing system, a respective user feature mapping value of each service scenario of the plurality of the service scenarios of the website, wherein the respective user feature mapping value of each service scenario is based on matching features of the to-be-matched product corresponding to the service scenario to respective representative features of the plurality of the users who have accessed the website through the service scenario, comprising:

quantifying a first user feature corresponding to a first matching feature of the to-be-matched product corresponding to each service scenario according to a quantification rule, wherein the quantification rule is the same for the plurality of the service scenarios; and calculating the respective user feature mapping value of each service scenario based on the first user feature corresponding to the first matching feature according to a mapping rule, wherein the mapping rule is the same for the plurality of the service scenarios;

selecting, by the data processing apparatus of the distributed computing system, among the plurality of service scenarios of the website, a target service scenario for the to-be-matched product based on the respective user feature mapping value of the target service scenario;

receiving, by the data processing apparatus of the distributed computing system of the website, a request for service information for the target service scenario of the website; and providing, by the data processing apparatus of the distributed computing system for display to a user, service scenario information and the to-be-matched product selected for the target service scenario of the website.

13. The computer-implemented system of claim 12, wherein the respective representative features of the plurality of the users who have accessed the web site through each service scenario comprises features derived from registration information or an access record of the plurality of the users who have accessed the website through each service scenario.

14. The computer-implemented system of claim 12, wherein selecting, among the plurality of the service scenarios of the website, the target service scenario for the to-be-matched product based on the respective user feature mapping value of the target service scenario comprises:
    selecting a service scenario having a lowest user feature mapping value among a plurality of respective user feature mapping values of the plurality of the service scenarios as the target service scenario for the to-be-matched product; or
    selecting a service scenario having a highest user feature mapping value among a plurality of respective user feature mapping values of the plurality of the service scenarios as the target service scenario for the to-be-matched product.

15. The computer-readable medium of claim 10, wherein the machine learning algorithm comprises at least one or more of a logistic regression algorithm, a Gradient Boosting Decision Tree (GBDT) algorithm, a decision tree algorithm, or a deep learning algorithm.

16. The computer-implemented system of claim 12, wherein obtaining features of the to-be-matched product to be presented to the users accessing the website through one of the service scenarios comprises acquiring matching features of the to-be-matched product corresponding to one of the service scenarios based on the respective representative features of the plurality of the users who have accessed the website through the service scenarios according to a machine learning algorithm.

17. The computer-implemented system of claim 16, wherein the machine learning algorithm comprises at least one or more of a logistic regression algorithm, a Gradient Boosting Decision Tree (GBDT) algorithm, a decision tree algorithm, or a deep learning algorithm.

18. The computer-implemented system of claim 12, wherein calculating the respective user feature mapping value of each service scenario based on the matching features of the to-be-matched product corresponding to each service scenario comprises:
    obtaining a mapping function between the respective user feature mapping value of each service scenario and the matching features of the to-be-matched product corresponding to each service scenario using a machine learning method; and
    calculating the respective user feature mapping value of each service scenario based on the mapping function.

* * * * *

UNITED STATES PATENT AND TRADEMARK OFFICE
CERTIFICATE OF CORRECTION

| | | |
|---|---|---|
| PATENT NO. | : 11,010,783 B2 | Page 1 of 1 |
| APPLICATION NO. | : 15/800823 | |
| DATED | : May 18, 2021 | |
| INVENTOR(S) | : Shen et al. | |

It is certified that error appears in the above-identified patent and that said Letters Patent is hereby corrected as shown below:

In the Specification

Column 1/Line 3, Below "SCENARIOS" insert -- CROSS REFERENCE TO RELATED APPLICATIONS --.

In the Claims

Column 20/Line 19, In Claim 2, after "the" delete "web site", and insert -- website --.

Column 20/Line 41, In Claim 4, after "the" delete "web site", and insert -- website --.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*